United States Patent [19]

Rosenbush et al.

[11] 4,021,215
[45] May 3, 1977

[54] DUAL COMBINED CYCLE AIR-CONDITIONING SYSTEM

[75] Inventors: Fred M. Rosenbush, Newington, Conn.; Robert Telakowski, Fair Lawn, N.J.

[73] Assignee: United Technologies Corporation, Hartford, Conn.

[22] Filed: May 3, 1976

[21] Appl. No.: 682,414

[52] U.S. Cl. .................................. 62/402
[51] Int. Cl.² .............................. F25D 9/00
[58] Field of Search ........... 62/239, 241, 244, 402

[56] References Cited
UNITED STATES PATENTS

| | | | |
|---|---|---|---|
| 2,930,205 | 3/1960 | Walker | 62/402 |
| 3,052,106 | 9/1962 | Sampietro et al. | 62/402 |
| 3,097,504 | 7/1963 | Quick et al. | 62/402 |
| 3,144,317 | 8/1964 | Arnoldi | 62/402 |
| 3,355,905 | 12/1967 | Berhold et al. | 62/402 |
| 3,369,777 | 2/1968 | Furlong | 62/402 |
| 3,523,428 | 8/1970 | Nagyszalanczy | 62/402 |
| 3,587,243 | 6/1971 | Keller | 62/402 |
| 3,623,332 | 11/1971 | Fernandes | 62/402 |

Primary Examiner—Lloyd L. King
Attorney, Agent, or Firm—John D. Del Ponti

[57] ABSTRACT

There is described a turbine/compressor air cycle system including a source of bleed air, means for feeding the bleed air directly to a turbine, means for adjustably feeding a portion of the bleed air to a compressor and means for feeding used cabin air to the compressor, the amount of bleed air being fed to the compressor being dependent upon whether high or low bleed air is extant.

8 Claims, 3 Drawing Figures

DUAL COMBINED CYCLE AIR-CONDITIONING SYSTEM

BACKGROUND OF THE INVENTION

This invention relates to turbine/compressor air cycle systems and more particularly to such an air cycle system wherein a single shaft air cycle machine provides alternatively, both a simple/recirculation cycle and a simple/bootstrap cycle.

It is a known art to condition air for the cabin of an aircraft by causing high temperature bleed air to work in a turbine to lower its temperature and pressure preparatory to ingress to the cabin. Bleed air is typically supplied by the supercharger of a piston engine, by an auxiliary power unit or engine (APU) or from a gas turbine engine. At various times, the bleed air is at various pressures. It may be, for example, that while the aircraft is at cruise power or higher or is on the ground with bleed air being supplied by a high pressure APU, the bleed air is at relatively high pressure (e.g., 50 psi). This is in contrast to when the aircraft engines are at ground idle or idle descent, in which case bleed air is at relatively low pressure (e.g., 25 psi). In the past, systems have been designed to maximize effectiveness of a high pressure bleed air supply by incorporating mechanisms which utilize a simple cycle, i.e., a system wherein relatively high pressure bleed air is fed directly to the turbine to do work therein and lower the temperature and pressure of the air. In the simple air cycle, the turbine uses the rotary power created by the high pressure air to drive a fan which pulls ram air or ambient air through a heat exchanger and then exhausts this air overboard. The bleed air is fed through the heat exchanger prior to entering the turbine so that the work performed by the turbine is also used to produce a cooling air flow in the heat exchanger to further cool the air from the bleed.

Prior art systems have also been designed to utilize low pressure bleed air by incorporating components wherein the bleed air is first fed to a compressor. The compressor, in turn, passes the air through the turbine to produce work in the well-known bootstrap air cycle. The term bootstrap relates to the fact that the compressor output is fed to the turbine which, of course, increases the power of the turbine and the turbine in turn drives the compressor.

In one unique example of a bootstrap-type air cycle system, reference is made to U.S. Pat. No. 3,428,242 to Rannenberg dated Feb. 18, 1969 and of common assignee as the present invention, the teachings of which are incorporated herein by reference. In that patent, a single shaft three-wheel machine includes, on a common shaft, a turbine, a compressor and a fan. The compressor receives the bleed air, passes it via a heat exchanger to the turbine for driving the turbine which, of course, drives the compressor. The turbine also drives the fan which functions to force ram or ambient air through the heat exchangers. Since the fan power is derived as in a simple cycle, and the compressor power as in a boot-strap cycle, this scheme has been referred to as a simple/bootstrap system. The air output of the turbine is the conditioned air for the cabin of the aircraft. One of the unique features of the device described by the aforesaid patentee is the fact that the conditioned air is passed over the bearings of the machine in order to cool them to temperatures compatible with shaft lubrication.

Although the prior art has recognized the usefulness of both high and low pressure bleed air and has provided means for utilizing one or the other, the need has remained for a single system which can utilize both in a simple and effective manner.

SUMMARY OF THE INVENTION

An object of the invention is to provide an improved combined cycle system in a single shaft air cycle machine which is designed to operate effectively at both high and low bleed pressures.

According to one aspect of the present invention, a single shaft three-wheel machine, wherein a turbine drives both a compressor and a fan, utilizes both bleed air and recirculated air in a controlled manner to operate either in a combined simple/recirculation cycle or in a combined simple/bootstrap cycle. The present invention contemplates such an aircraft air-conditioning system and includes means for feeding bleed air directly to the tubine, means for adjustably feeding a portion of the bleed air to the compressor and means for feeding used cabin air to the compressor. According to the invention, the means for varying the flow of bleed air to the compressor may be pressure responsive valve means to permit efficient system operation depending on whether high or low pressure bleed air is available. For high pressure bleed, the flow to the compressor is preferably blocked in order to put the system in a combined simple/recirculation cycle mode while for low pressure bleed, a preselected amount of flow to the compressor is permitted to put the system in a combined simple/bootstrap cycle mode.

BRIEF DESCRIPTION OF THE DRAWING

An understanding of the invention will become more apparent to those skilled in the art by reference to the following detailed description when viewed in light of the accompanying drawings, wherein.

DESCRIPTION OF THE PREFERRED EMBODIMENT

Figure 1:
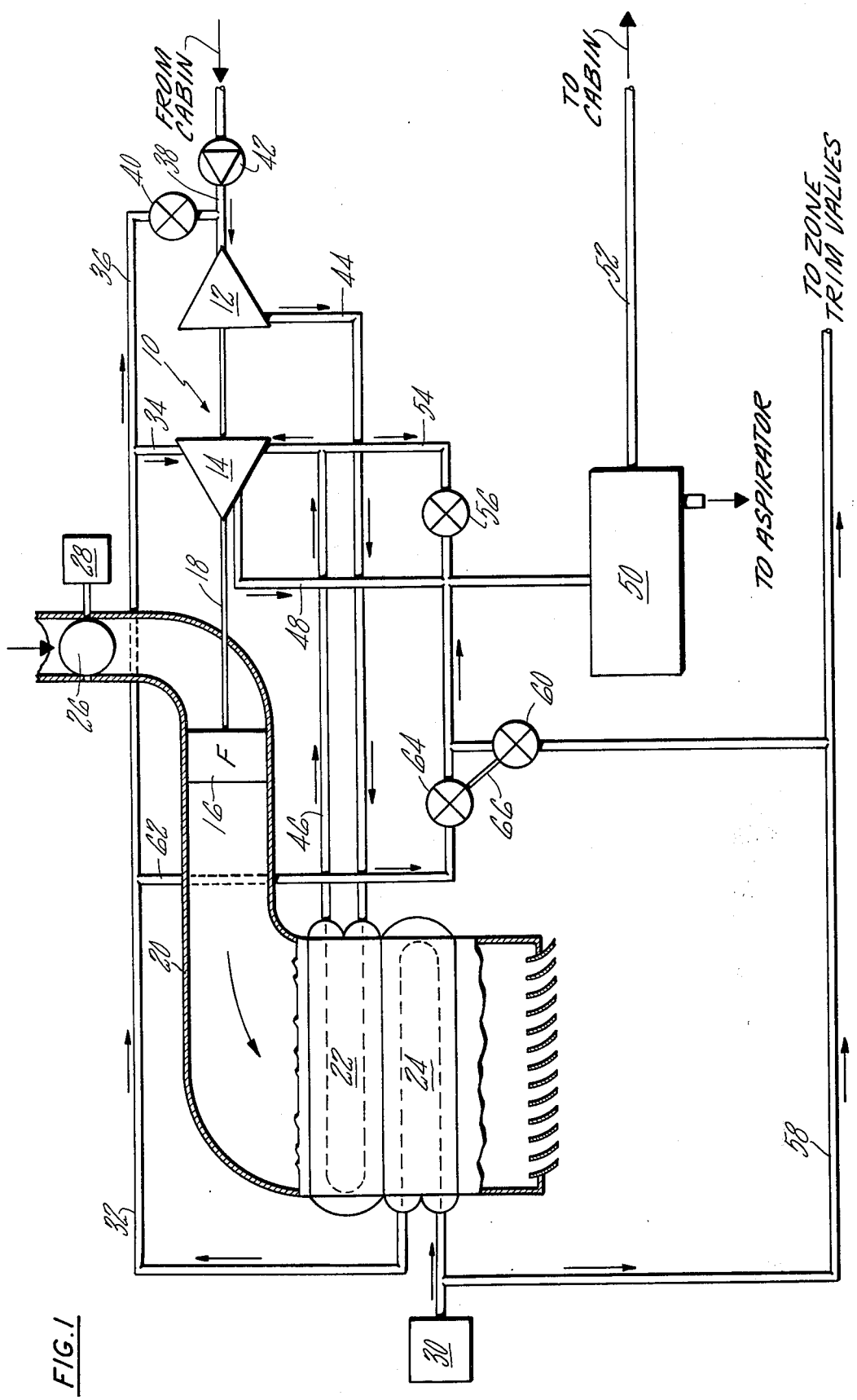
FIG. 1 is a diagram of a particular arrangement in accordance with the invention.

Referring to FIG. 1, a three-wheel air cycle machine 10, such as described in the aforementioned U.S. Pat. No. 3,428,242, comprises a compressor 12, a turbine 14 and a fan 16 all mounted on a common shaft 18. The fan 16 is located in a duct or conduit 20 which receives fresh or ambient air at one end thereof from outside of the aircraft and directs the air through first and second heat exchangers 22 and 24 and then discharges the air overboard of the aircraft. The inlet to the duct 20 may be provided with a butterfly valve 26 suitably controlled by an electric actuator 28 in order to control, in combination with the fan 16, the flow of air in the duct.

A bleed air source 30, typically either a compressor of an aircraft gas turbine engine or an auxiliary power unit, is utilized to supply high temperature air to a conduit 32 which leads through the primary heat exchanger 24 to the inlet of an axial outlet turbine 14 via branch conduit 34 and to the inlet of axial inflow compressor 12 via branch conduit 36 and recirculation conduit 38. The flow of bleed air to the compressor 12 is controlled by valve 40. The valve 40 may be suitably responsive to the pressure of the bleed air to block flow to the compressor when the pressure is high, e.g., 50 psi and increasingly permit flow thereto as the pressure lessens.

The recirculation conduit 38 emanates from the cabin of the aircraft and when check valve 42 is open, permits used air from the cabin to flow to the compressor 12 by the low suction pressure of the compressor. The air entering the compresor 12 is compressed therein and discharged through its outlet into conduit 44 which leads to the recirculating heat exchanger 22. From the heat exchanger 22, the compressed air flows through conduit 46 to a second inlet on the turbine 14. The outflow of the turbine 14 discharges to a suitable duct 48 which leads to water separator 50 and thence through conduit 52 to the cabin. A bypass conduit 54 between conduits 46 and 48 is provided with a valve 56 for controlling the flow of low pressure air to the turbine second inlet. As will be appreciated by those skilled in the art, water collected in the water separator 50 is typically fed to an aspirator (not shown) located in the air duct 20 for additional cooling of the air thereby. Additionally, in order to modulate the temperature of the air in turbine exhaust duct 48, a heating bypass duct 58 is provided to bypass air from the bleed source upstream of the primary air heat exchanger 24 directly to the turbine exhaust conduit 48 via suitable valve means 60. In conjunction therewith, a temperature control bypass duct 62 is provided to bypass bleed air from downstream of the primary air heat exchanger 24 to the turbine exhaust duct 48 via suitable valve means 64. The valve means 60 and 64 are preferably butterfly valves mounted to a common linkage 66 and suitably controlled as by an electric actuator so that only one of the valves is open at any given time.

Figure 2:
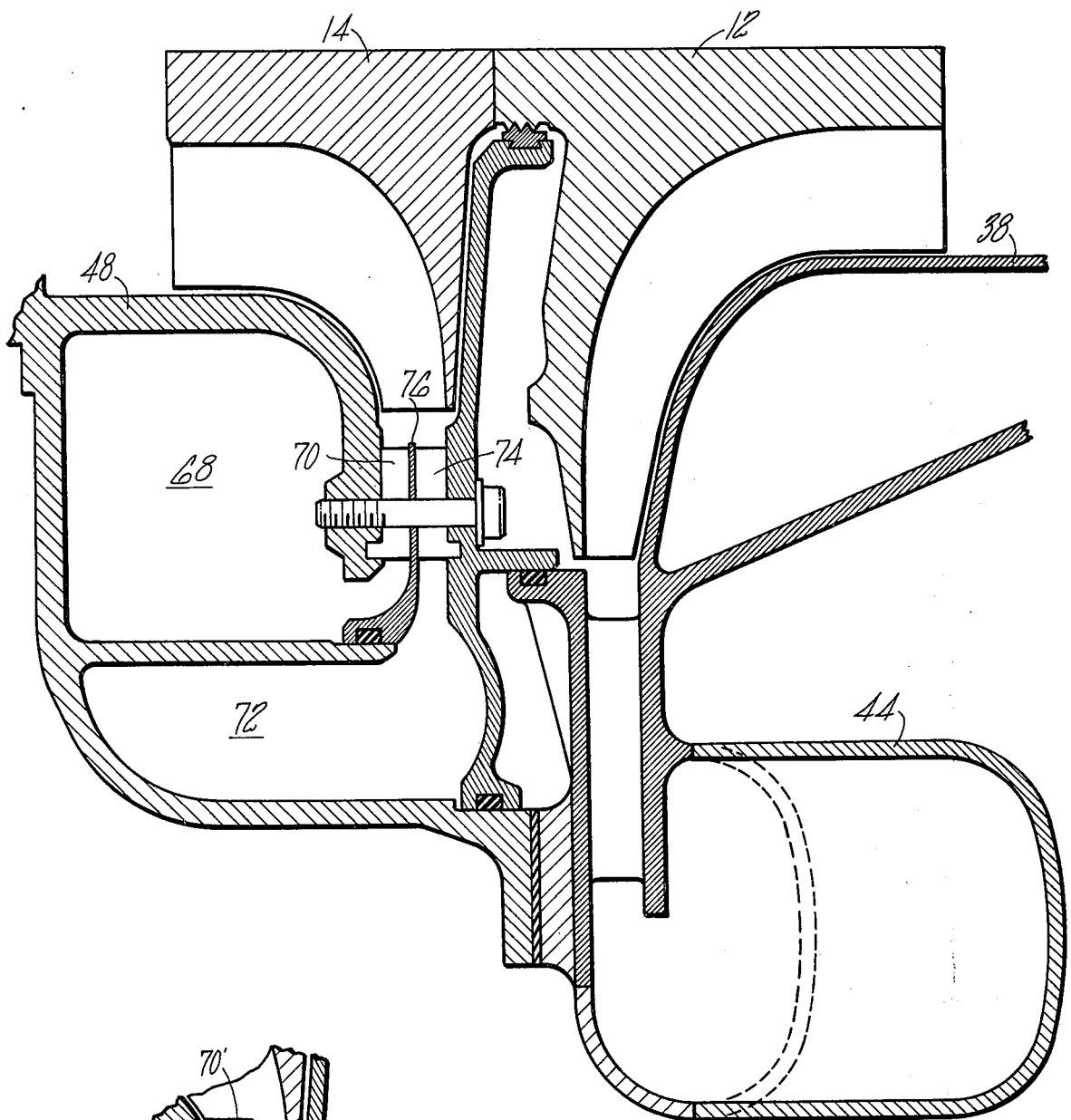
FIG. 2 is an elevational view, in section, of an exemplary compressor and turbine portion of the three-wheel cycle machine of the present invention.

Referring now to FIG. 2, the compressor 12 and turbine 14 are shown in more detail. As will be appreciated, the compressor increases the pressure and temperature of the air supplied by the conduits 36 and/or 38. The compressed air is egressed through line 44 to the recirculating heat exchanger 22 and returned to the turbine 14 via line 46 which leads to an admission chamber 68 and nozzles 70. Simultaneously, the primary bleed air from lines 32 and 34 is admitted to the turbine 14 via admission chamber 72 and nozzles 74. The nozzles 70 and 74 extend about the entire circumference of the turbine rotor. It can be seen, of course, that by virtue of admission chambers 68 and 72 and turbine nozzles 70 and 74, which are separated by a diaphragm 76, that dual admission is provided to the turbine. Thus two separate air streams are supplied to the turbine nozzles with mixing initiated upstream of the turbine rotor and completed at the turbine exit.

The above-described configuration can, of course, be achieved in alternate fashion. It is contemplated, for example, that instead of having admission from both chambers about the entire circumference of the turbine rotor, one set of nozzles 70 may be disposed about only a portion of the circumference with the other set of nozzles 74 disposed about the remaining circumferential portion. As will be appreciated, the chambers 68 and 72 may be of plenum, scroll or volute configuration, but each has its own inlet connection to receive, respectively, relatively low and high pressure air.

Figure 3:
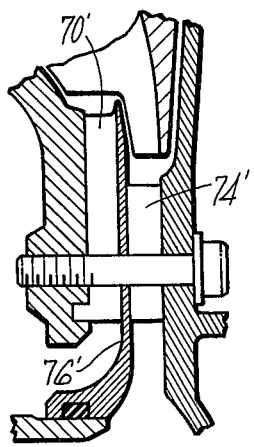
FIG. 3 is a fragmentary elevational view, in section, of a modification of a portion of the turbine portion shown in FIG. 2.

In another modification to more efficiently utilize differing incoming pressures, as shown in FIG. 3, the nozzles 70' and 74' and the turbine rotor may be stepped to increase efficiency by matching reaction pressures. As shown, the nozzles 70' have a greater chord length than the nozzles 74'.

By virtue of the dual source configuration, extreme system flexibility is provided for efficient operation at both low system bleed pressures and high system bleed pressures. When bleed pressure is low, a simple cycle system is simply not potent enough to obtain low exit temperatures and bleed is thus fed to both the turbine and the compressor. At high pressure, such as when a high pressure APU is operating and larger quantities of airflow for the cabin are desired, valve 40 is closed and thus turbine 14 receives all of the bleed air directly — the compressor accepting cabin air only (or possibly ambient fresh air) to provide additional cooling by using more of the specific energy supplied by the bleed air.

What has been set forth above is intended primarily as exemplary to enable those skilled in the art in the practice of the invention and it should therefore be understood that, within the scope of the appended claims, the invention may be practiced in other ways than as specifically described.

We claim:

1. In an aircraft air-conditioning system wherein outside air is used to cool bleed air which is sequentially fed to a compressor and a turbine and supplied to the aircraft cabin, the improvement which comprises means for separately feeding at least a part of said bleed air directly to said turbine, means for varying the amount of flow of said bleed air to said compressor, and means for feeding used air from said cabin to said compressor.

2. The invention of claim 1 wherein said means for varying flow is responsive to high pressure bleed air to block flow of said bleed air to said compressor to cause said system to operate in a combined simple/recirculation cycle.

3. The invention of claim 1 wherein said means for varying flow is responsive to low pressure bleed air to permit flow of said bleed air to said compressor to cause said system to operate in a combined simple/bootstrap cycle.

4. In an aircraft air-conditioning system wherein outside air is used to cool bleed air which is conditioned and supplied to the cabin, a dual cycle combined simple/bootstrap and simple/recirculation system comprising:
   a source of bleed air;
   an air duct for receiving said outside air;
   a single shafted, three-wheel machine having a shaft, a fan assembly on one end of said shaft in said air duct, a compressor assembly on the other end of said shaft, a turbine assembly on said shaft intermediate said fan assembly and said compressor assembly;
   heat exchange means in said air duct;
   first passage means for passing said bleed air from said source through said heat exchange means to said tubine assembly;
   second passage means for passing used cabin air from said cabin to said compressor assembly;
   third passage means connected between said first passage means and said second passage means for passing a portion of said bleed air into said compressor assembly;

valve means in said third passage means for controlling airflow therein;

fourth passage means for passing compressed air from said compressor assembly through said heat exchange means to said turbine assembly; and fifth passage means for passing air from said turbine assembly to said cabin.

5. The invention of claim 4 wherein said turbine assembly includes a turbine housing and a turbine rotor, said first passage means includes a first chamber in said turbine housing and a first set of nozzles between said first chamber and said turbine rotor and said fourth passage means includes a second chamber in said turbine housing and a second set of nozzles between said second chamber and said turbine rotor.

6. The invention of claim 5 wherein said first and second sets of nozzles are separated by a diaphragm and each extend about the entire circumference of said turbine rotor.

7. The invention of claim 5 wherein said first set of nozzles is disposed about a portion of the circumference of said turbine rotor and said second set of nozzles is disposed about the remaining portion of the circumference of said turbine rotor.

8. The invention of claim 5 wherein the nozzles of the first set have a different chord length than the nozzles of the second set.

* * * * *

UNITED STATES PATENT OFFICE
CERTIFICATE OF CORRECTION

PATENT NO. : 4,021,215
DATED : May 3, 1977
INVENTOR(S) : Fred M. Rosenbush and Robert Telakowski It is certified that error appears in the above-identified patent and that said Letters Patent are hereby corrected as shown below:

In the Abstract, line 7 — the word -- pressure -- should be inserted after "low"

Column 3, line 16 — the word -- outlet -- should be inserted after "outflow"

Column 4, Claim 4, line 62 - "tubine" should read -- turbine --

Signed and Sealed this sixteenth Day of August 1977

[SEAL]

Attest:

RUTH C. MASON
Attesting Officer

C. MARSHALL DANN
Commissioner of Patents and Trademarks